(12) United States Patent
Chiang (10) Patent No.: US 9,088,639 B2
(45) Date of Patent: Jul. 21, 2015

(54) TABLET PERSONAL COMPUTER TRANSFORMER FOR PORTABLE COMMUNICATION DEVICE

(76) Inventor: Kuo-Ching Chiang, Linkou Township, Taipei County (TW)

( * ) Notice: Subject to any disclaimer, the term of this patent is extended or adjusted under 35 U.S.C. 154(b) by 778 days.

(21) Appl. No.: 13/162,896

(22) Filed: Jun. 17, 2011

(65) Prior Publication Data
US 2012/0032902 A1 Feb. 9, 2012

Related U.S. Application Data

(63) Continuation-in-part of application No. 12/852,468, filed on Aug. 7, 2010, now abandoned.

(30) Foreign Application Priority Data

Aug. 24, 2010 (TW) .............................. 99128344 A (51) Int. Cl.
| | |
|---|---|
| G06F 3/041 | (2006.01) |
| H04M 1/725 | (2006.01) |
| H04M 1/02 | (2006.01) |
| G06F 1/16 | (2006.01) |
| G06F 3/14 | (2006.01) |

(52) U.S. Cl.
CPC .......... *H04M 1/0266* (2013.01); *G06F 1/1647* (2013.01); *G06F 1/1652* (2013.01); *G06F 1/1654* (2013.01); *G06F 3/0412* (2013.01); *G06F 3/1431* (2013.01); *H04M 1/72527* (2013.01)

(58) Field of Classification Search
CPC .......... H04M 1/72527; H04M 1/7253; H04M 1/0266; G06F 1/1647; G06F 3/1431; G06F 1/1652; G06F 1/1654
USPC .......... 345/173–184; 455/3.06, 556.1, 556.2, 455/557
See application file for complete search history.

(56) References Cited

U.S. PATENT DOCUMENTS

| | | | |
|---|---|---|---|
| 5,197,092 A * | 3/1993 | Bamburak | 379/211.05 |
| 6,882,326 B2 * | 4/2005 | Hirayama et al. | 345/1.1 |

(Continued)

OTHER PUBLICATIONS iphoneFAQ.com, "How can I send a multimedia message (MMS) from the Apple iPhone?", Jul. 2, 2007, downloaded from iphonefaq.org/archives/97158.*

(Continued)

*Primary Examiner* — Larry Sternbane
(74) *Attorney, Agent, or Firm* — Bui Garcia-Zamor; Jessica H. Bui, Esq.

(57) ABSTRACT

The tablet computer transformer includes an external extension display. An extension interface is coupled to the extension display; an extension display is coupled to the control unit through the extension interface for displaying video or image from the portable communication device. It has to be noted that the portable communication device is a separated device from the external extension display when the portable communication device disconnects from the external extension display and is transformed into a tablet or pad computer when the portable communication device connects to the external extension display. The command, instruction and signal transfer are made through the extension interface. The displayed video or image is processed by the portable communication device and is displayed by the external extension display, thereby transforming the portable communication device to the tablet or pad computer after the cellular is integrated into the tablet computer transformer.

11 Claims, 7 Drawing Sheets

(56) References Cited

U.S. PATENT DOCUMENTS

| | | | |
|---|---|---|---|
| 7,266,391 B2* | 9/2007 | Warren | 455/557 |
| 7,970,436 B1* | 6/2011 | Katzer et al. | 455/557 |
| 2005/0099360 A1* | 5/2005 | Yueh | 345/1.1 |
| 2006/0194619 A1* | 8/2006 | Wilcox et al. | 455/566 |
| 2007/0010289 A1* | 1/2007 | Mezue | 455/557 |
| 2008/0304688 A1* | 12/2008 | Kumar | 381/370 |
| 2010/0283969 A1* | 11/2010 | Cooperstock et al. | 351/201 |

OTHER PUBLICATIONS

Shah, Agam, "Its Here! Apple's iPad arrives in U.S. Stores", Computerworld, Apr. 3, 2010; downloaded from http://www.computerworld.com/article/2516725/computer-hardware/it-s-here--apple-s-ipad-arrives-in-u-s--stores.html.*

* cited by examiner

FIGURE 8

TABLET PERSONAL COMPUTER TRANSFORMER FOR PORTABLE COMMUNICATION DEVICE

The application is a continuation-in-part (CIP) application of Ser. No. 12/852,468, filed on 7 Aug. 2010, entitled "Portable Communication Device Having an Extension Display."

FIELD OF THE INVENTION

The present invention generally relates to a tablet personal computer transformer, and especially to a tablet computer transformer for a portable communication device to transform the portable communication device into a tablet computer.

DESCRIPTION OF THE PRIOR ART

Because of the development of information technology (IT), information could be exchanged with higher capacity and faster speed. Internet is designed as an open structure to exchange information freely without restriction. Today, a third generation mobile phone standard allows a user to access video communication through air. Thus, certain communication service requiring real time information exchange, such as viewing live video, has become feasible through a mobile phone communication network or Internet. Mobile phone communications systems typically include multiple base stations for communicating with mobile stations in various geographical transmission areas. Each base station provides an interface between the mobile station and a telecommunications network. Mobile phone communications systems are in use or being developed in which a geographic coverage area of the system is divided into smaller separate cells, and a mobile phone communicates with the network via a fixed station located in the cell. Mobile phones belonging to the system are free to travel from one cell to another. When a subscriber within the same system or within an external system wishes to call a mobile subscriber within the system, the network must have information on the actual location of the mobile phone. In pace with the development of information and computer technology, the electronic products grow rapidly with the trend of small size, multifunction and high operation speed. Based on the development of cellular integration technology, communication systems have also been introduced to allow users to obtain information more conveniently. Thus, the business accompanied with the communication device flourish as well due to the development of the communication technology. The Internet and communication service providers also offer business services to assist customers to transfer information or extend the market. The mobile phone manufactures have to release new models with different appearances, functions and styles more frequently so as to attract the attention of customers and occupy a favorable marketing share. Communication services providers or information services providers also have to provide diverse, comprehensive and latest information to customers. However, signals received by the communication module are presented on the display after processed. Generally, a display screen of a conventional portable device is too small to enable a user to browse a webpage or video image. Accordingly, the present invention is introduced to overcome aforementioned difficulties.

SUMMARY OF THE INVENTION

The main object of the present invention is to provide a wireless and portable communication device provided with a built-in or an external extension display to enable a user to browse a webpage or image information, via the Internet.

It is also an object of the present invention to provide a tablet personal computer transformer.

In accordance with the present invention, a portable communication device is equipped with an extension display including a control unit; a main display coupled to the control unit for displaying dial information to facilitate communication; an extension display coupled to the control unit, wherein an area of the extension display is greater than an area of the main display, so as to display at least one part of web page or image information. The portable communication device further comprises a detecting module coupled to the control unit to facilitate the detection of a signal of webpage or image information. A switch device is coupled to the control unit to transfer the webpage or image information to the extension display.

The extension display includes a LCD (Liquid Crystal Display) or an OLEO (Organic Light Emitting Diode) display. Regarding a built-in extension display, a storage device is provided to store the extension display; in another example, an extension interface is provided to couple to the extension display. The extension display comprises a touch display.

The tablet computer transformer includes an external extension display. An extension interface is coupled to the extension display; an extension display is coupled to the control unit through the extension interface for displaying video or image from the portable communication device, wherein a display area of the extension display is greater than an area of the main display of the portable communication device. It has to be noted that the portable communication device is a separate device from the external extension display, when the portable communication device disconnects from the external extension display, and is transformed into a tablet or pad computer, when the portable communication device connects to the external extension display. The command, instruction and signal transfer are made through the extension interface. The displayed video or image is processed by the portable communication device and is displayed by the external extension display, thereby transforming the portable communication device to the tablet or pad computer after the mobile phone is integrated into the tablet computer transformer. The external extension display includes a touch screen and a detecting module coupled to the control unit to facilitate the function of detection of a signal of webpage or image information.

The tablet computer transformer further comprises a switch device coupled to the control unit to transfer the video or image to the external extension display. The external extension display may include a receiving slot or cavity formed on the back side of the tablet computer transformer having an extension display to receive the portable communication device. A backup power (i.e., battery or extension power) is provided for recharging the portable communication device or a peripheral device; a backup memory is provided in the tablet computer transformer to expend the storage space for the portable communication device or a peripheral device. The tablet computer transformer further comprises a processor which perform its function accompany with the mobile phone functions to upgrade the performance of the portable communication device. The tablet computer transformer further comprises an image capturing device. A recharging/charging interface is also provided in the tablet computer transformer for charging the portable communication device or a peripheral device.

In accordance with the present invention, a tablet computer transformer system comprises a portable communication device having a main display; at least one wireless communication module coupled to a network to receive Internet data including a webpage; a memory to store image or video; an external extension display provided for the portable communication device; and a receiving cavity arranged to receive the portable communication device and a control unit. An extension interface is set in the receiving cavity and coupled to the control unit; the extension display is coupled to the portable communication device through the extension interface for displaying the video or the image sent from the portable communication device or displaying the Internet data; wherein a display area of the extension display is greater than an area of the main display of the portable communication device, wherein the portable communication device is a separate device from the external extension display when the portable communication device disconnects from the tablet computer transformer and is transformed into a tablet computer when the portable communication device connects to the external extension display; and wherein the displayed video or image is processed by and sent from the portable communication device or the control unit and displayed by the extension display, thereby transforming the portable communication device to the tablet or pad computer.

DESCRIPTION OF THE PREFERRED EMBODIMENT

The present invention can be applied to any wireless communication device including, but not limited to, a cell phone, a PDA (personal digital assistant), or a GPS (global positioning system). In general wireless communication systems, communication network service providers from different systems or regions use various communication protocols or two-way pager communication protocols; however, the present invention is not limited to any kind of protocols. The present invention discloses a tablet PC (personal computer) transformer, typically referred to a computer shaped in the form of a notebook or a slate with capabilities of being written on, via the use of digitizing tablet technology or a touch screen.

Figure 1:
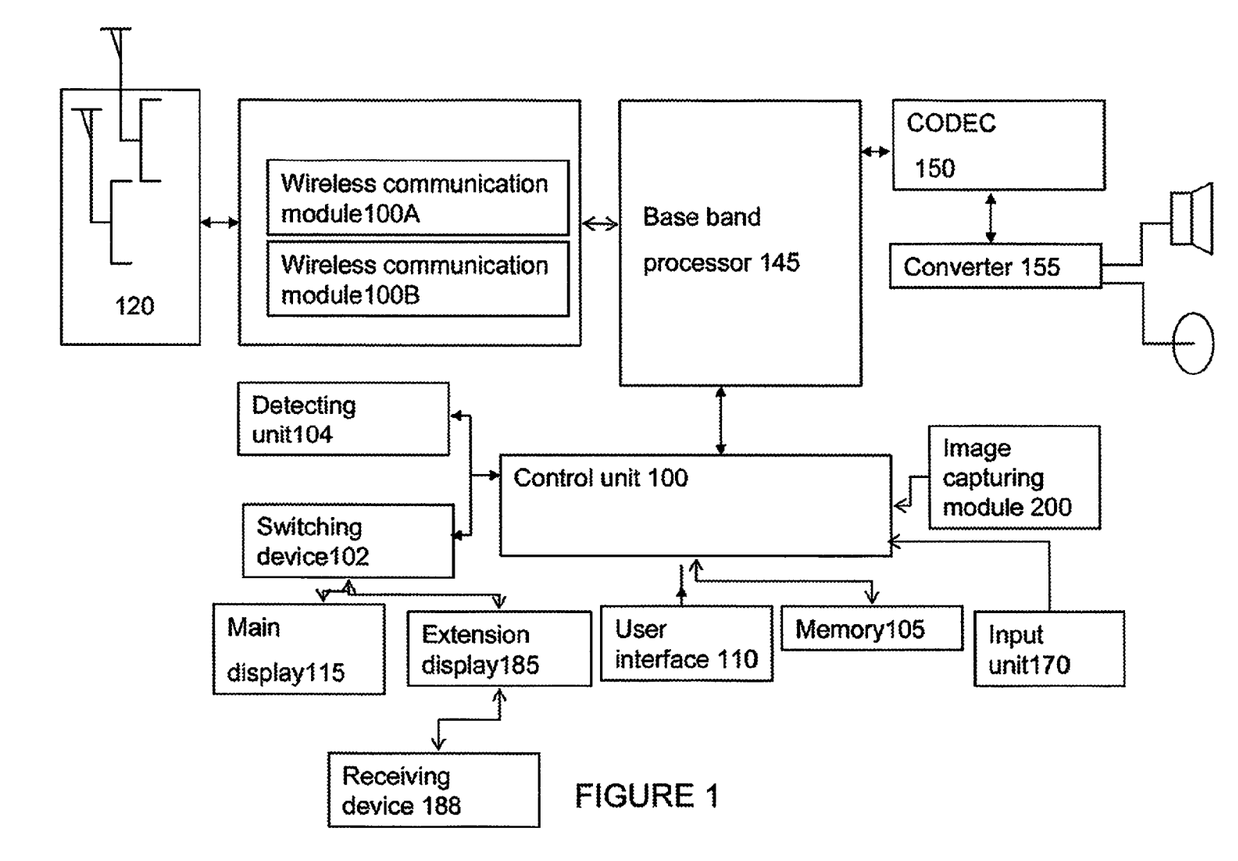
FIG. 1 shows a block diagram of a portable communication device according to an example embodiment of the present invention.

Referring now to FIG. 1, a block diagram of a wireless and portable communication device of the present invention is shown. For the sake of simplicity, an example embodiment of the portable communication device is introduced hereinafter as an explanation; however, such an example embodiment not used to limit the present invention in anyway, i.e., the present invention can be modified to facilitate to use other different kinds of communication systems or protocols without departing from the spirit and scope of the present invention. For example, a single chip system can be introduced to integrate chips or processors hereinafter. The portable communication device includes a control unit 100, such as a CPU (central processing unit), which is used to process or control commands, information, data, and computing of the device. Memory 105, for example, ROM (read only memory), non-volatile memory such as a flash memory and/or RAM (random access memory) is coupled to the control unit 100. Generally, permanent data is stored in the ROM, and an operation program (OS) or application programs such as driver applications can generally be stored in the non-volatile memory which can still retain the data stored therein when a power supply is unavailable and can be read or written repeatedly when the power supply is available. The system operation program (OS) and application programs stored in the non-volatile memory control the execution of all necessary functions and can be presented on the main display 115 through the user interface 110 after processed by the CPU or the control unit 100. An input unit 170 is coupled to the control unit 100 to facilitate a user to key in commands or data. The main display 115 is a screen of a general portable communication device, such as a LCD or OLED display.

The antenna system 120 may be a multi-band antenna or can be composed by a plurality of antennas, according to demands. Aforementioned antenna may be dipole antenna, plane antenna, inverted-F Antenna, fractal antenna, etc. The antenna system 120 is coupled to a wireless communication module 100A to receive signals. The wireless communication module 100A is suitable for transferring information during movement, and may generally include: converting signals to an IF (intermediate frequency) through oscillator signals of a mixing region of a receiver. The converted signals are modified to a bandwidth predetermined by the protocol at a transmitter, and transmitted by the antenna system 120. A modem is coupled to the receiver and the transmitter to modulate or de-modulate signals. Aforementioned protocol can be an audio/video wireless communication protocol, which may include, but not limited to International Telecommunications Unit (ITU): 3G, 3.5 G, 4G, W-CDMA, CDMA2000, CDMA2001, TD-CDMA/TD-SCDMA, UWC-136, and DECT. A base band processor 145 is coupled to the modem of the wireless communication module 100A to process the signals with a predetermined bandwidth and communication protocols. A second wireless communication module 1006 may be introduced, which may include, but not limited to, WiFi, Wimax, or 802.11(a, b, g, n), and can exist individually or together with the wireless communication module 100A. Signals processed by the base band processor 145 include control signals and audio signals, the control signals are transmitted to the control unit 100 and the audio signals are transmitted to a CODEC 150; a voice converter 155 is coupled to the CODEC 150 to convert digital signals to analog signals or to convert analog signals to digital signals. A microphone 160 and a speaker 165 are coupled to a voice converter 155 respectively. A SIM card connector (not shown in FIG. 1) is introduced to facilitate insertion of a SIM card into the system. The SIM card can be connected to the control unit 100, via the SIM card connector such that information and password stored in the SIM card can be accessed by the control unit 100. In addition, the present invention may also include a digital image capture module 200 connected to the control unit 100 to capture images, which may be a CMOS image sensor or CCO array.

Generally, a main display of a conventional portable communication device is too small to display an entire webpage. As a result, the user has to move the webpage continuously, thereby causing an inconvenient to the user. The present invention includes a detecting unit 104 arranged to detect whether the Internet is connected thereto or not. If an Internet signal is detected or a browser is activated, the control unit 100 activates a switching device 102 and transfer Internet signals or alternatively, all or part of information to the extension display 185 to drive the extension display 185 to display all or part of the information, thereby facilitating a visual display of webpage information. A display area of the extension display 185 is greater than a display area of the main display 115, and the user can determine whether the display is switched or not. In the case, the portable communication device 10 may drive the main display 115 and the extension display 185 at the same time. For a type of built-in extension display, a receiving device 188 is provided to receive the extension display 185.

An example of such an extension display 185 is a flexible display, such as an OLED display. The flexible extension display can be rolled and received in a storage space, and can be drawn back to spread out the display. Aforementioned OLED (Organic Light-Emitting Diode) is also called OLED (Organic Electroluminesence Display). Advantages of OLED include luminescence, wide view angle, high contrast, low power consumption, high response speed, full color, simplified manufacturing process, etc. The species of OLED display comprise single-color type, multi-color type, and full-color type, etc. OLED displays can be classified as PMOLED (passive matrix OLED) and AMOLED (active matrix OLED) according to the differences of driving means. PLED (polymer light emitting diode) may also be introduced. Folding mechanism can also be introduced to facilitate a flexible display according to the present invention. For example, a receiving device 188 can be a folding mechanism to receive the extension display 185. When the detecting unit 104 detects that the folding mechanism is under operation, then Internet signals or all or part of information is transferred to the extension display 185 for an extension display. A receiving device 188 can also be a roller-type receiving device, shown in FIGS. 3A-3E, including: a reel 305 for rolling a flexible display 300; a central fixed stick 306; a spring rolled around the central fix stick 306 in the reel 305; and a locking mechanism including a ratchet 315 and a detent 315*a* used to prevent the spring 310 from loosening when the flexible display 300 is spread out, shown in FIG. 3B and FIG. 3D, and to loosen the spring 310 when the flexible display 300 is rolled up, shown in FIG. 3C and FIG. 3E.

Figure 3A:
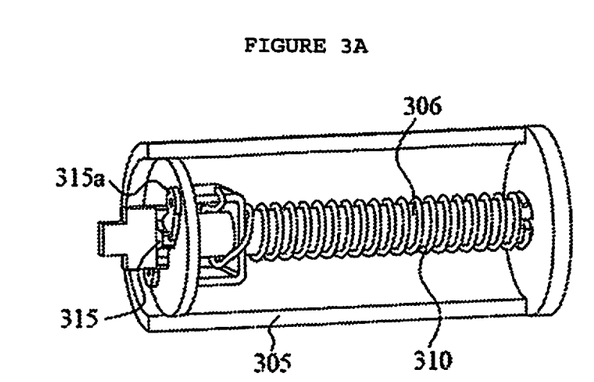
FIGS. 3A-3E show a flexible display as an extension display according to an example embodiment of the present invention.
Figures 3B, 3C, 3D:
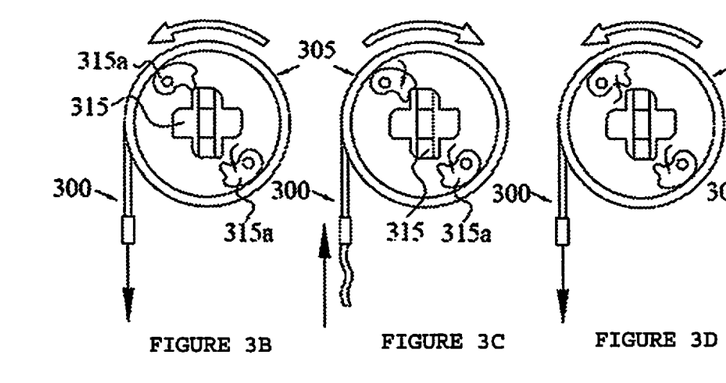
Figure 3E:
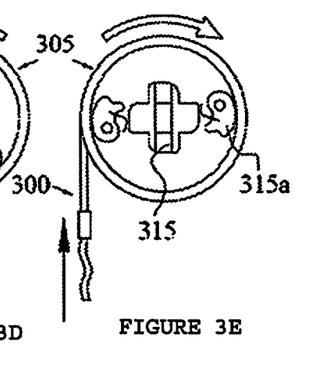

As further shown in FIG. 3B and FIG. 3D, the flexible display 300 can be fixed or secured after it is extended. The flexible display 300 may be a flexible OLED rolled around the reel 305. For receiving the flexible display 300, a user can just release the flexible display 300 after pulling hard, and then the flexible display 300 will be rolled up. Generally, the reel 305 is provided with a spring 310 rolled around a central fixed stick 306 configured in the reel 305. Tighten the flexible display 300 which is spread out, and then a locking mechanism 315, such as a ratchet 315 and a detent 315*a*, can be introduced to prevent the spring 310 from being loosen when the flexible display 300 is extended. However, the ratchet 315 will not clamp when the flexible display 300 is pulled suddenly, thereby loosening the spring 310, such that the flexible display 300 will be rolled up, shown in FIG. 3C and FIG. 3E.

Figure 2:
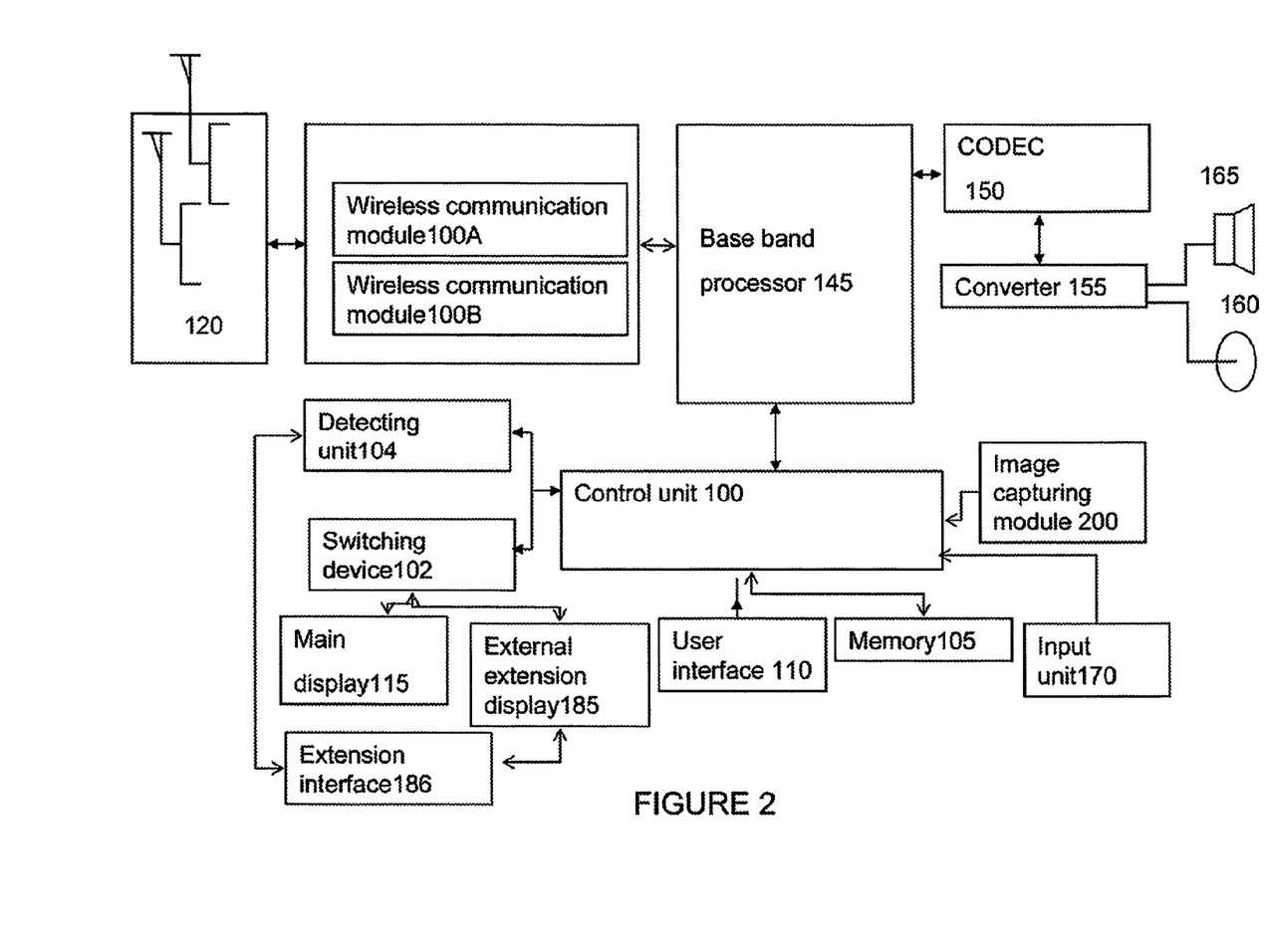
FIG. 2 shows a block diagram of a portable communication device according to another embodiment of the present invention.

FIG. 2 shows a block diagram of a portable communication device according to another embodiment of the present invention. In the embodiment shown in FIG. 2, an external extension interface 186 is introduced. When the detecting unit 104 detects an external signal, a switching signal is transferred to the switch device 102, so as to transfer Internet data or signals or at least part of information to the external extension display 185 to drive the extension display 185 to display the image or video. Aforementioned "switching" can be achieved manually or automatically by the software. Aforementioned detecting unit 104 can be a single circuit or an integrated circuit (IC) and may obtain parameters directly or indirectly. Messages received by the wireless is portable communication device of the present invention can transfer all or part of webpage information manually or automatically to the extension display 185 by the switch device 102 to enable a user to browse the webpage.

Other embodiments are similar to aforementioned embodiments, and the difference is described as follows. When the detecting unit 104 detects video or dynamic, still image signals, such as video format, photo format, digital TV signals or MPEG signals, the control unit 100 activates the switching device 102 to switch video signals to the extension display 185. For example, a commercial processor which can process and decode the compressed MPEG file may be introduced, such as a media player chip having a H.264 codec engine. For example, the processor chip is composed by a CPU core, a media engine, a graphics processor, and a virtual mobile engine (VME). The CPU core is based on the design of R4000 of MIPS, and comprises a floating point processor (FPU) and a vector floating point processor (VFPU), such that the ability of floating point computing can reach more than 2.6GFlops per second; the media engine can use R4000 which is an identical one used in the CPU core, and includes an independent embedded 2 MB memory to assist the system to process audio/video stream. Thus, an embedded memory is introduced to adapt to the vector process unit including H.264 decompression, and various process demands such as audio process. A utilization rate of the processor chip may be improved by design of altering information process dynamically, thereby simplifying design of the chip and reducing the loss of power. Software can also be introduced to decode or process signals.

Figure 4:
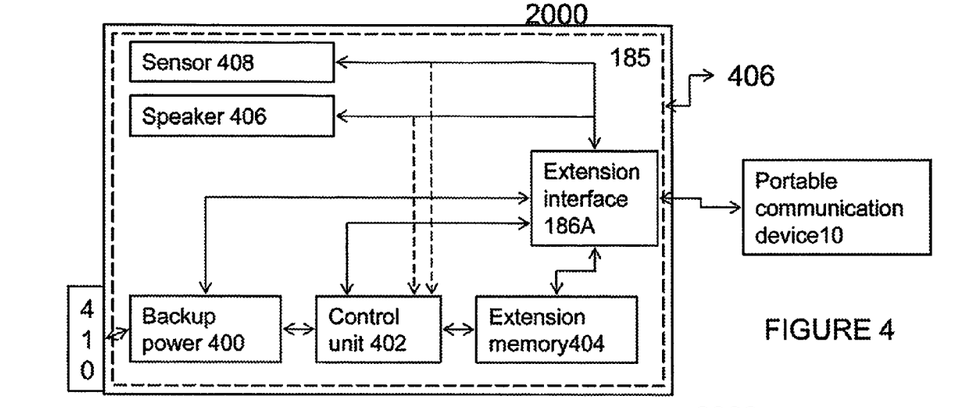
FIG. 4 shows a block diagram of a tablet computer transformer having an extension display according to an embodiment of the present invention.

Referring now to FIG. 4, another example of a tablet computer transformer 2000 having an external extension display 185 according to the present invention is shown. A control unit 402 is provided in the tablet computer transformer 2000, and the portable communication device 10 may be, for example, mobile phone, media player, digital camera or digital video camera. The tablet computer transformer 2000 having an external extension display 185 and the portable communication device 10 are connected through the extension interface 186A set aside or in the backside of the tablet computer transformer 2000. The portable communication device 10 is provided with a driver to drive the external extension display 185. The driver application may be installed in the external extension display 185. A backup power (or extension power) 400 is electrically coupled to the control unit 402 to provide power by the tablet computer transformer 2000 or recharge the portable communication device 10 or the peripheral device, thereby extending the operation duration of the portable communication device 10 or the peripheral device. A charging interface 410 is provided for recharging the external extension display 185 or the tablet computer transformer 2000 from an external power or to recharge the portable communication device 10 or the peripheral device by the tablet computer transformer 2000. An image capturing device 408, such as a CMOS or CCO sensor, and extension speakers 406 are also respectively and electrically coupled to the control unit 402 or/and the extension interface 186A in order to transmit the image captured by the image capturing device 408 to a remote terminal, or to output the video signal and/or the audio signal downloaded by the portable communication device 10 to the extension display 185 and the speaker 406 via the extension interface 186A, thereby transforming the portable communication device 10 into a tablet computer. Extension memory 404 is electrically coupled to the control unit 402 and/or the extension interface 186A to act as an extension memory or a backup memory for the portable communication device 10. A plug-in memory card or flash memory card may be utilized. The external extension display 185 includes a touch screen to receive instructions, via human fingers' touch, thereby controlling the external extension display 185 or the portable communication device 10. The touch technologies include a resistance type, a capacitance type, an extra sonic type, and an optical type. The present invention may relay image or video signals to the external extension display 185 to transform the portable communication device 10 into a tablet personal computer and to extend the operation duration or memory storage for the portable communication device 10, the digital image capturing device or the media player.

Figure 5:
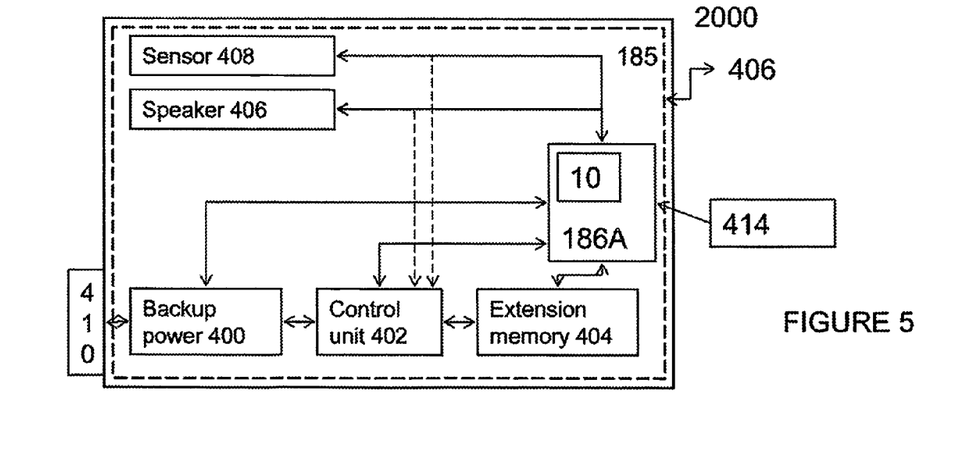
FIG. 5 shows a block diagram of a tablet computer transformer having an external extension display according to an embodiment of the present invention.
Figure 5A:
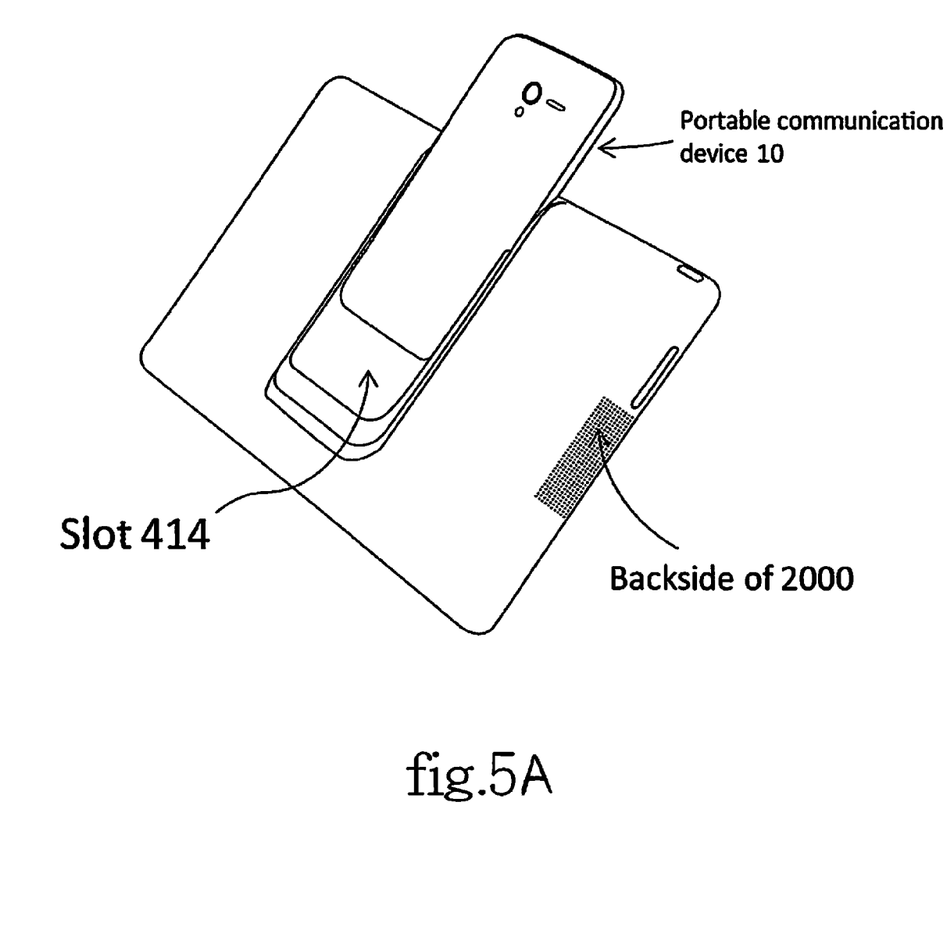
FIG. 5A shows a backside of a tablet computer transformer having a receiving slot or cavity to accommodate insertion of a portable communication device according to an embodiment of the present invention.

FIG. 5 shows a block diagram of a tablet computer transformer having an external extension display according to an embodiment of the present invention. In contrast, FIG. 5A shows a backside of a tablet computer transformer having a receiving slot or cavity to accommodate insertion of a portable communication device according to an embodiment of the present invention. As shown in FIG. 5 and FIG. 5A, the external extension display 185 is provided with a receiving slot or cavity 414 set in the tablet computer transformer 2000 to receive insertion of the portable communication device 10 into the external extension display 185 in order to integrate the tablet computer transformer 2000 and the portable communication device 10 by the extension interface 186A. In the case, the extension interface 186A is set in the receiving slot or cavity 414 to allow and accommodate insertion of the entire portable communication device 10 into the receiving slot or cavity 414 for integrating with the tablet computer transformer 2000. In a preferred embodiment, the receiving slot or cavity 414 is set on the back side surface of the tablet computer transformer 2000 as shown in FIG. 5A and FIG. 7.

Figure 6:
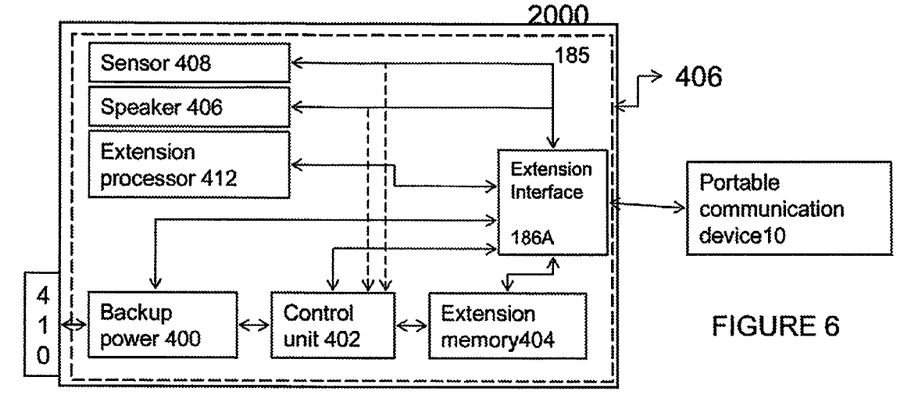
FIG. 6 shows a block diagram of a tablet computer transformer having an extension display and an extension processor according to the present invention.
Figure 7:
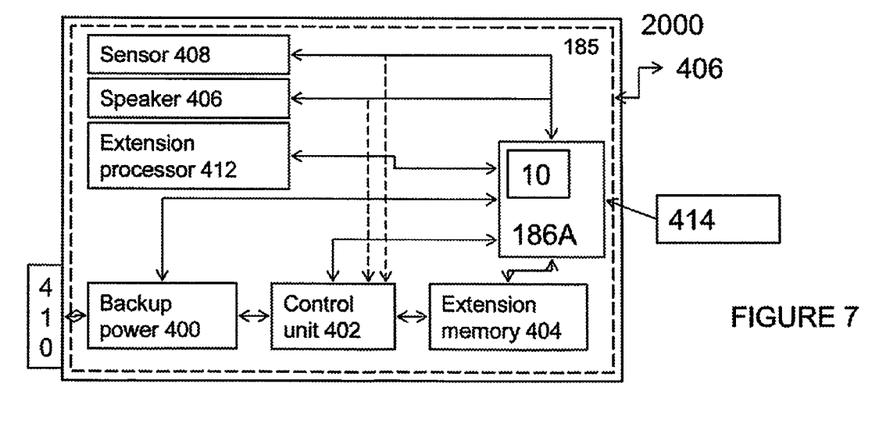
FIG. 7 shows a block diagram of a tablet computer transformer having an external extension display and an extension processor according to the present invention.
Figure 8:
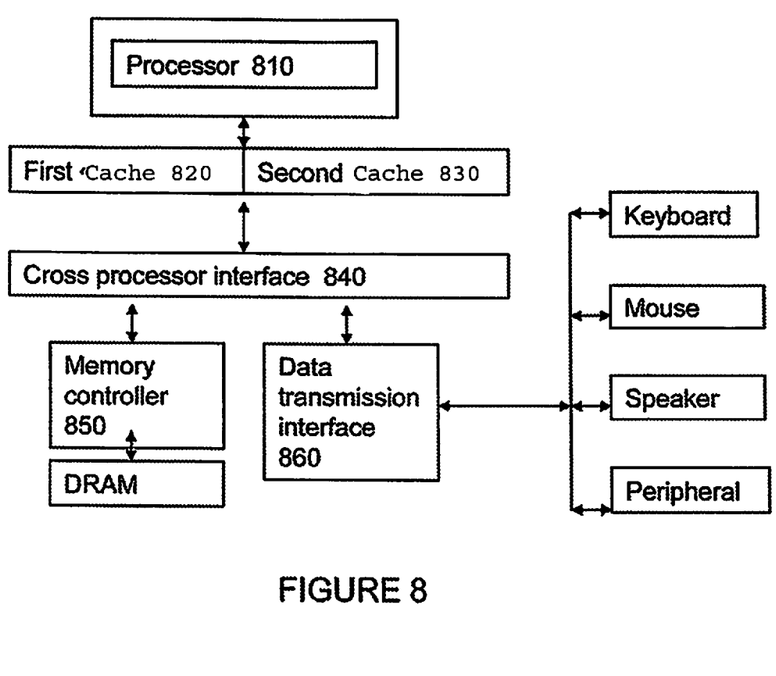
FIG. 8 shows a block diagram of an extension processor according to an embodiment of the present invention.

Other examples are shown in FIG. 6 and FIG. 7. These examples include all or part of the elements in the embodiment as shown in FIG. 1, FIG. 2, FIG. 4, FIG. 5, and FIG. 5A. As shown in FIG. 6 and FIG. 7, an extension processor 412 is coupled to the control unit 402; and the extension interface 186A in order to upgrade the portable communication device 10 to a dual core processor for improved performance. FIG. 8 shows a scheme including the control unit 402 and the extension processor 412. The extension processor 412 includes a processor 810 which is coupled with a first cache 820 and a second cache 830 respectively. A cross processor interface 840 is electrically coupled to the first cache 820 and the second cache 830. A memory controller 850 and a data transmission interface 860 are coupled to the cross processor interface 840 to determine data output and input to/from the control unit 100 and the processor 810. The present invention discloses a tablet computer transformer system designed to transform a mobile phone and a media player into a tablet personal computer. The data may be processed by the portable communication device 100, the media player or the extension display. The image video or Internet data are transferred from the portable communication device 100, the media player to the external extension display 185 to allow a user to browse a webpage and watch video by the external extension display 185 having a larger display area. In another example embodiment, the second wireless communication module 1008 may be coupled to the extension interface 186A to achieve wireless transmission. Under the case, the extension interface 186A fulfills the requirement of the wireless transmission protocols and specification.

Aforementioned units and modules can be combined arbitrarily according to demands. As will be understood by persons skilled in the art, the foregoing preferred embodiment of the present invention is illustrative of the present invention rather than limiting the present invention. Having described the invention in connection with a preferred embodiment, modification will now suggest itself to those skilled in the art. Thus, the invention is not to be limited to this embodiment, but rather the invention is intended to cover various modifications and similar arrangements included within the spirit and scope of the appended claims, the scope of which should be accorded the broadest interpretation so as to encompass all such modifications and similar structures. While the preferred embodiment of the invention has been illustrated and described, it will be appreciated that various changes can be made therein without departing from the spirit and scope of the invention.

What is claimed is:

1. A tablet computer transformer system to transform a portable communication device into a tablet computer, the tablet computer transformer system comprising:
    a portable communication device having a main display, at least one wireless communication module coupled to a network to receive data via the Internet, and a memory to store video or images; and
    a tablet computer transformer having a receiving slot on a back side to receive insertion of said portable communication device; an extension interface set in said receiving slot; an extension display on a front side and coupled to said portable communication device, via said extension interface, to display video or images sent from said portable communication device or data received from the Internet: an extension memory to store data backup from said portable communication device; a backup power arranged to supply power to said tablet computer transformer and to charge or recharge said portable communication device, via a charging interface, when said portable communication device is inserted into said receiving slot of said tablet computer transformer;
    wherein said extension display is a touchscreen panel provided to enable a user to interact directly with display components, via touching the screen with one or more fingers, and to control operation of said tablet computer transformer and said portable communication device;
    wherein said touchscreen panel is provided with a display area greater than an area of said main display of said portable communication device;
    wherein said portable communication device is transformed into a tablet computer to enable the user to browse the Internet, when said portable communication device is electrically connected with said extension display of said tablet computer transformer;
    wherein said video or images are transferred from said portable communication device to said tablet computer and is displayed on said extension display of said tablet computer transformer; and wherein said extension display is a flexible display provided with a roller-type receiving device including a reel for rolling the flexible display, and a locking mechanism to secure the flexible display after the flexible display is spread out for a visual display and to release the flexible display after the flexible display is rolled up for storage.

2. The tablet computer transformer system according to claim 1, wherein, when said portable communication device is transformed into said tablet computer, said portable communication device executes one or more applications resident at said tablet computer transformer.

3. The tablet computer transformer system according to claim 1, wherein said tablet computer transformer further comprises a processor coupled to said extension interface to upgrade performance of said portable communication device.

4. The tablet computer transformer system according to claim 1, wherein said tablet computer transformer further comprises an image capturing device to capture an image and transmit the image captured to a remote terminal.

5. The tablet computer transformer system according to claim 1, wherein said charging interface is also arranged to charge a peripheral device.

6. The tablet computer transformer system according to claim 1, wherein said extension interface operates in compliance with wireless transmission protocols and specification.

7. A tablet computer transformer system to transform a portable communication device into a tablet computer, the tablet computer transformer system comprising:
    a portable communication device having a main display, at least one wireless communication module coupled to a network to receive data via the Internet, and a memory to store video or images; and
    a tablet computer transformer having a receiving slot to receive insertion of said portable communication device, an extension display to display video or images sent from said portable communication device or data received from the Internet, and an extension memory to store data backup from said portable communication device;
    wherein said extension display is a touchscreen panel provided to enable a user to interact directly with display components, via touching the screen with one or more fingers, and to control operation of said tablet computer transformer and said portable communication device;
    wherein said portable communication device is transformed into a tablet computer to enable the user to browse the Internet, when said portable communication device is electrically connected with said extension display of said tablet computer transformer;
    wherein said video or images are transferred from said portable communication device to said tablet computer and is displayed on said extension display of said tablet computer transformer; and
    wherein said extension display is a flexible display provided with a roller-type receiving device including a reel for rolling the flexible display, and a locking mechanism to secure the flexible display after the flexible display is spread out for a visual display and to release the flexible display after the flexible display is rolled up for storage.

8. The tablet computer transformer system according to claim 7, wherein, when said portable communication device is transformed into said tablet computer, said portable communication device executes one or more applications resident at said tablet computer transformer.

9. The tablet computer transformer system according to claim 7, wherein said tablet computer transformer further comprises:
    a backup power arranged to supply power to said tablet computer transformer and to charge or recharge said portable communication device, via a charging interface, when said portable communication device is inserted into said receiving slot of said tablet computer transformer;
    a processor coupled to said extension interface to upgrade performance of said portable communication device; and
    an image capturing device to capture an image and transmit the image captured to a remote terminal.

10. The tablet computer transformer system according to claim 9, wherein said charging interface is also arranged to charge a peripheral device.

11. The tablet computer transformer system according to claim 7, wherein said extension interface operates in compliance with wireless transmission protocols and specification.

* * * * *